Nov. 17, 1931.  A. G. DECKER  1,832,101
TOOL ARM
Filed April 28, 1927  3 Sheets-Sheet 1

Inventor
Alonzo G. Decker

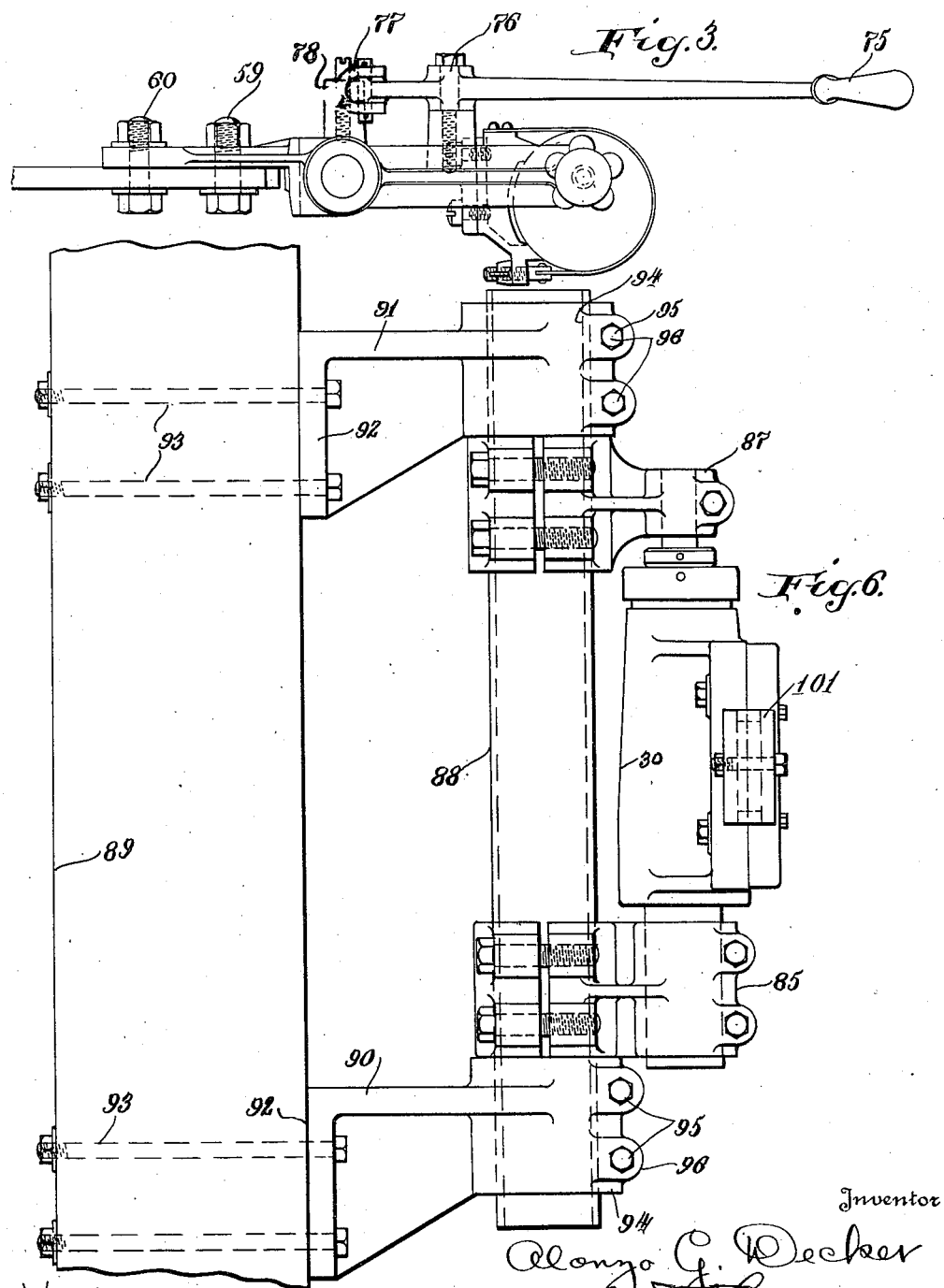

Nov. 17, 1931.  A. G. DECKER  1,832,101
TOOL ARM
Filed April 28, 1927    3 Sheets-Sheet 3
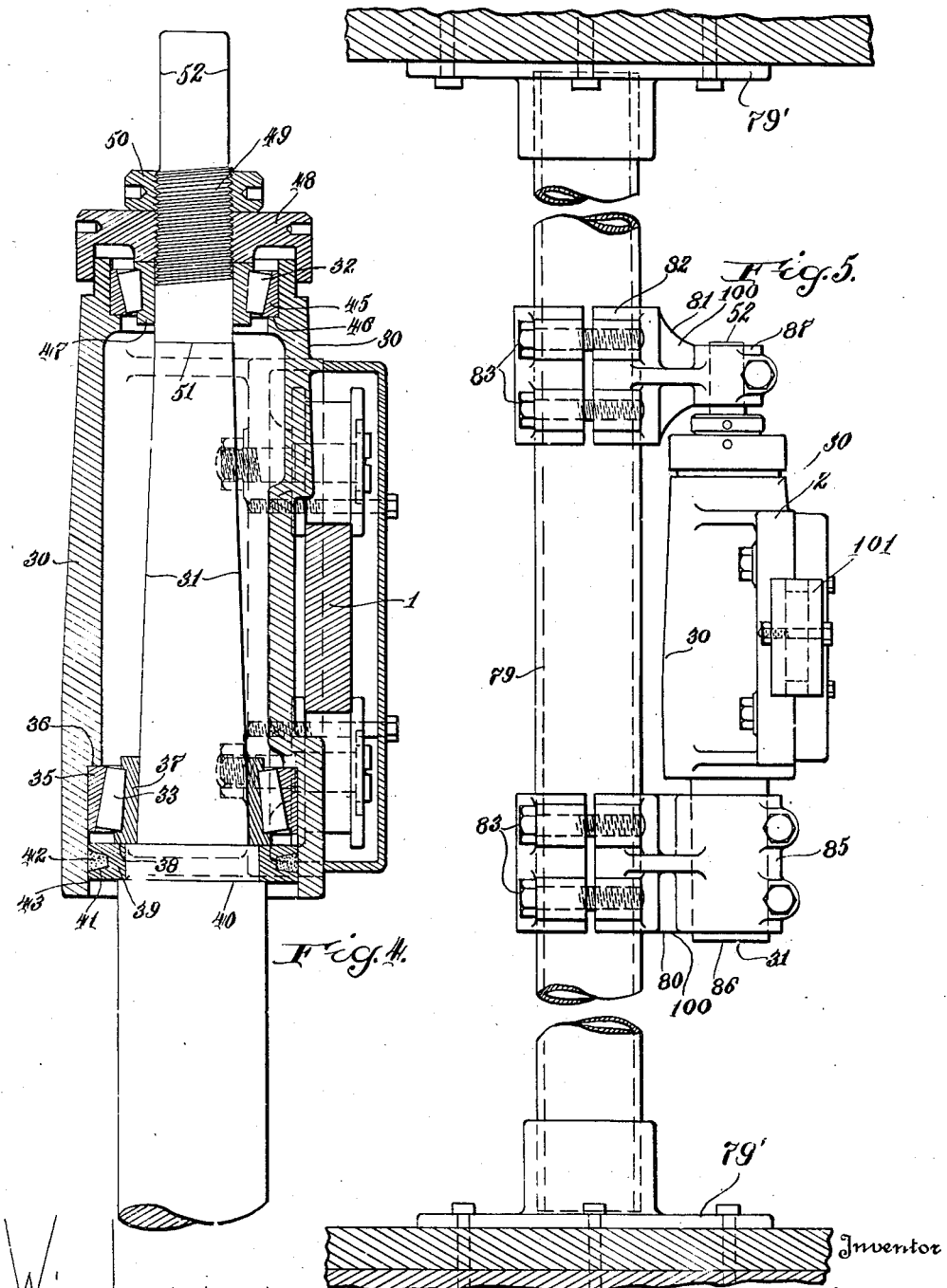

Patented Nov. 17, 1931

1,832,101

UNITED STATES PATENT OFFICE

ALONZO G. DECKER, OF BALTIMORE COUNTY, MARYLAND, ASSIGNOR TO THE BLACK AND DECKER MANUFACTURING COMPANY, OF TOWSON HEIGHTS, MARYLAND, A CORPORATION OF MARYLAND

TOOL ARM

Application filed April 28, 1927. Serial No. 187,163.

While manually portable power driven screw drivers, socket wrenches, stud setters and drills and other similar portable tools are possessed of great advantages in the way of flexibility, initial expense and space occupied, they are subject to certain disadvantages on account of the necessity for manually supporting and directing them. These difficulties have been overcome in one direction by the provision of a stand or support whereby the drill is caused to operate after the manner of a drill press. With this device, however, the extreme flexibility and radius of operation of the portable tool are lost.

The present invention relates to a supporting arm for such tools whereby the flexibility and radius of operation are retained and the operator is, at the same time, relieved of the necessity for supporting the tool during operating. This gives all the advantages in the way of accuracy and precision with the low cost, economy of space, and mobility incident to the ordinary manually portable power driven tool. The device not only serves as a support for carrying the weight, but also takes up the torque reaction of the tool and provides means for covering a definite area with a minimum of effort on the part of the operator.

The advantages of drill press operation may be retained and the tool arm may be mounted either on a post, column or floor pedestal or stand. The tool bracket is preferably swiveled, giving various angles of the spindle for drilling, tapping, or stud setting on inclined surfaces, of which the cylinder of a V type motor is a good example.

An important feature of the construction relates to the means for mounting the arm whereby ease and accuracy of operation are retained without the necessity for extreme accuracy in the machining of the parts, resulting in a great saving in the expense of production. The approved construction also possesses numerous other advantages which will be more fully brought out in the description.

In the accompanying drawings I have illustrated a tool supporting arm construction embodying the various features of my invention in the preferred form.

In the drawings:

Figure 3 is a top plan view of the tool bracket and tool at the right in Figure 1.

Figure 4 is a section on the line 4—4 of Figure 1 taken at right angles to the plane of said figure.

Figure 5 is a view of the arm looking from the left of the same as in Figure 1, illustrating the manner of supporting the same on a column.

Figure 6 is a similar view illustrating the manner of supporting the arm, which support may be attached either to a column or to the wall or frame of a building.

Figures 1, 2:
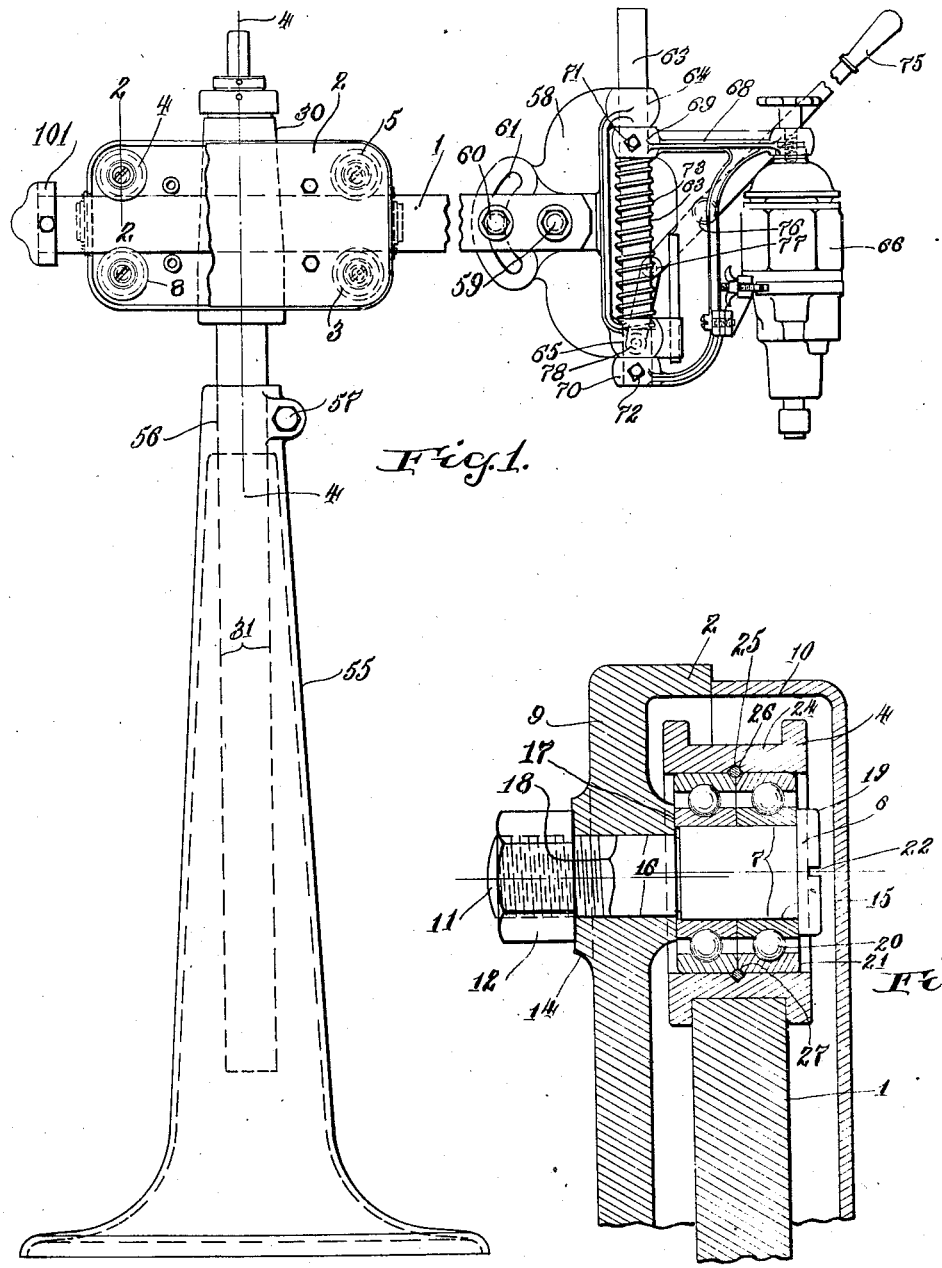
Figure 1 is a side elevation of a tool supporting arm embodying the features of the invention, the arm being, in the form shown, supported on and constructed for support on a floor pedestal. In the form shown, the tool arm is broken away intermediately and shortened for convenience of illustration and the drawing shows a tool and tool bracket supported on the end of the tool arm.
Figure 2 is a section on the line 2—2 in Figure 1.

Referring to the drawings by numerals, each of which is used to indicate the same or similar parts in the different figures, the invention comprises a tool arm 1 which may be of any length depending on the range desired. This tool arm is mounted for translation in the direction of its length in and through bearing box 2 in which it is supported and guided for longitudinal motion. In the form of the invention shown, it is supported on roller bearings 8, 3 beneath the arm, the arm being further guided and held in horizontal position by rollers, 4, 5 engaging the arm from above.

Part of the anti-friction rollers 8, 3 and 4, 5 which support and guide the arm may be mounted for adjustment. The rollers so mounted are preferably the two upper rollers 4, 5, the object being to provide means for easily taking up or adjusting for variations in machining and also for taking up wear.

Figure 2 is a detailed view of what is at present regarded as the preferred method of mounting the adjustable rollers. The illustration shows the upper roller 4 mounted on an eccentric stud 6 having a shank or small diameter portion 18 seated in the frame and a large diameter eccentric portion 7 carrying the roller. The large diameter 7 of the stud is eccentrically placed as to the portion 18 of smaller diameter which is seated in the base or frame 9 of the box 2 which comprises, in addition to the base or frame portion 2, a cover portion 10 which encloses the rollers 8, 3 and 4, 5. The small diameter portion 18 which is seated in the frame has a threaded end 11 for engagement by and with a nut 12 which is turned up against a boss 14 on the frame surrounding the stud hole. The large diameter portion 7 of the stud is enclosed within the inner ball race 15 of the ball bearing 20 which supports the roller, the outer race being indicated by reference character 21.

When the nut 12 is tightened it clamps the inner race 15 of the ball bearing between the shoulder 17 on the frame surrounding the stud hole 16 and the head 19 of the stud 6. The shank 18 of the stud being eccentrically located in relation to the bearing support 7, or vice versa, the position of the ball bearing 20 carrying the roller 4 and hence the position of the roller itself, may be adjusted by loosening the nut 12, rotating the stud which has a screw driver slot 22 until the roller takes the desired position, then tightening the nut 12 to hold it in that position.

The roller rim or roller proper 24 is held in position on the outer race by means of a spring ring 25 mounted in an annular groove 26 in the inner circumference of the roller, which spring ring springs into a registering groove 27 which encircles the outer periphery of the outer ball race.

In the preferred form of the invention shown, the bearing box 2 is formed integrally with a hub member 30 which rotates on and about an upright shaft 31 which is provided with combined thrust and radial bearings 32 at the upper end, and 33 at its lower end. These bearings, as shown, are of a well known type of tapered roller bearing, but any type of anti-friction bearing capable of taking up both radial and thrust load can be used.

The outer race 35 of the lower bearing seats against a shoulder 36 in the hub and the inner race 37 is mounted on the upright shaft 31 resting against a support 38 which may be referred to as a shoulder presented by the upper surface of a collar 39 which encircles the upright shaft 31, in turn resting on an upwardly disposed shoulder 40 formed on the shaft. This collar 39 acts as a grease retainer and dust shield, being provided with a peripheral groove 41 which is filled with soft packing 42 which engages the inner surface 43 of the hub, closing contact with the same, preventing escape of the grease and excluding dust and other foreign matter.

The roller bearing 32 at the upper end of the hub comprises an outer race 45 resting against a shoulder 46 in the hub, and an inner race 47 which is adjustable along the shaft by means of a nut 48 engaging a thread 49 on the shaft and held in position by a lock nut 50.

The shaft 31 which is tapered from the collar 39 upwardly to a point just below the inner race 47 of the upper bearing, is cylindrical above the taper which terminates at 51, this portion of the shaft being threaded to engage the nuts 48 and 50, providing for the adjustment of the inner race 47. Above the thread 49 the shaft is further reduced in diameter as to the portion 52. While this construction has been described in minute detail it will be appreciated that many of these details are not essential, the structure being capable of wide variation.

Figure 1 shows the arm 1 mounted on a floor pedestal 55, the same being shown as hollow and provided with a split clamping collar 56 at its upper end which receives and holds the upright shaft 31, the same being vertically adjusted through the collar by loosening the nut 57 which holds the collar in clamped position moving the shaft to the desired position of adjustment and tightening.

The tool arm 1 is provided at its outer end with a bracket 58 pivotally connected to the arm at its outer end by a bolt 59 about which it rotates, the bracket being held in adjusted position on the arm and about the hole 59 by a second bolt 60 which engages an arcuate slot 61 which is concentric with the bolt 59. The arm bracket 58 is forked vertically and provided with upper and lower aligned slide bearings 64 and 65 in which a vertical bracket shaft 63 is mounted to slide.

The tool 66, which may be a screw driver, socket wrench, stud setter, or drill, is mounted on a tool bracket 68 secured to the tool in any suitable manner and provided with upper and lower aligned spaced tool shaft engaging collars 69 and 70. The upper collar 69 encircles the bracket shaft 63 and is secured thereto by a set screw 71 and the collar 70 is located below and in normal position in contact with the lower bearing 65 of the arm bracket 58. The lower tool bracket collar 70 encircles the lower end of the bracket shaft 63 and is shown as clamped thereto by a set screw 72 so that the tool bracket 68 is mounted on collars 69 and 70 clamped to the shaft 63, both of said collars being, in the normal position of the tool, immediately below and in contact with the corresponding collars 64 and 65 of the arm bracket.

The tool, as thus supported is mounted for motion in the direction of the length of the bracket shaft 63 by the sliding of the shaft 63 through the bracket arm collars 64 and 65, and the tool is supported in normal position, as shown in Figure 1, by means of a helical spring 73 which encircles the bracket shaft 63 between the upper tool bracket collar 69 and the lower bracket arm collar 65, bearing against both said collars.

Downward pressure on the tool imparts to it a downward motion along the shaft compressing the spring 73, and the tool is controlled and moves downwardly against the tension of the spring by means of a hand lever 75, the same being pivotally mounted intermediately of its length on a stud 76 in the tool bracket and pivotally connected at its lower end to the upper swinging end of a link 77 which is, in turn, pivotally connected at its lower end at 78 to the bottom bracket collar 65 of the tool arm bracket.

Figures 5 and 6 illustrate modified forms of the tool arm or, more particularly, the means for supporting the same.

Figure 5 shows a device for supporting the same on a column 79. This column, as shown, is a piece of pipe with pipe flanges 79' secured to the ceiling and floor at the top and bottom. This construction is used where no building column is available. This makes it possible to install the unit close to the work without regard to the location of building posts. The upright shaft 31 which carries the hub 30 with the bearing box 2 is mounted on column 79 by means of brackets 80 and 81, each of which consists of a split collar 82 enclosing the column and secured thereto by a clamping screw 83 which closes the collar. Each of said brackets also comprises a second split collar suitably connected to the first mentioned collar as by arms 100 and 101, the lower bracket 80 having a split collar 85 adapted to receive and engage and clamp the lower engaged end 86 of the shaft 31, and the upper bracket 82 having a smaller split collar 87 which receives and encloses and clamps the upper end 52 of the upright shaft 31.

Figure 6 shows a still further modification in which a member 88, corresponding to column 79 is supported in any desired position from and on a column or wall of a building 89, the said column member 88 being carried in wall or column brackets 90 at its lower end and 91 at its upper end, said column brackets comprising feet 92 secured to the wall or column by means of bolts 93 and each said bracket being provided at its outer end with a split collar 94 which receives and encloses the member 88 being clamped thereabout by clamping screws 95 engaging ears 96 on the opposite meeting ends of the split column.

The operation of the machine will be easily understood from the description. The tool is supported on the end of the elongated arm 1 which slides freely in the direction of its length through the bearing box 2, which may be provided with any suitable slide bearings, and is stopped at the ends of its traverse by a stop member 101 secured to the arm in any suitable manner. The bearing 2 being free to swing in a horizontal plane, permits the tool to be operated at any point within a radius of the length of the arm from the center of the upright shaft 31, Figure 1. The manner of mounting the bracket 58 on the pin 59 to swing in a vertical plane about the end of the arm permits the tool to be tipped at any desired angle, so that it can, for instance, be applied to the heads of a V type motor, and the mounting of the tool on the shaft 63 carried by the bracket 68 permits it to move up and down in the operating stroke supported by the spring 73, the operation of the tool, as supported on the arm, being very much like the operation of a drill press, the tool being freely moved up and down by means of the lever 75, which is preferably a hand lever.

The invention thus retains the advantages as to radius of operation incident to the unsupported hand tool, also relieving the operator of the support of the tool, and rendering its operation much more accurate. As to accuracy it has all the advantages incident to drill press operation.

I have thus described specifically and in detail a preferred and certain modified forms of the invention, the description being specific and in detail, in order that the nature and operation of the same may be clearly understood, however, the specific terms herein are used descriptively rather than in a limiting sense, the scope of the invention being defined in the claims.

What I claim as new and desire to secure by Letters Patent is:

1. A supporting arm for a portable power driven rotary tool, the same comprising a horizontal arm, a bracket mounted for adjustment relatively to said arm in a substantially vertical plane, said bracket carrying an upright shaft, a tool supporting bracket having collars engaging said shaft, and a spring encircling said shaft between said bracket and one of said collars whereby said spring tends to support said tool and tool bracket in their uppermost position, permitting them to be moved downwardly and returning them to said position.

2. The combination with a manually portable power driven rotary tool of a supporting arm, a bracket pivotally mounted on the arm and adjustable about a horizontal axis at right angles to the arm, and a second bracket carrying the tool and mounted on the first mentioned bracket to swing about an axis which is normally vertical and means supporting the tool providing for motion of the same parallel to said normally vertical axis.

3. The combination with a manually portable power driven rotary tool, of an elongated tool arm, a bracket pivotally mounted on the arm and adjustable about a horizontal axis at right angles to the arm and a second bracket carrying the tool and mounted on the first mentioned bracket to swing about a vertical axis, a support with roller bearings for the tool arm engaging the same to support the arm in a horizontal plane and permit it to slide in the direction of its length.

4. The combination with a manually portable power driven rotary tool, an alongated tool arm, a bracket pivotally mounted on the arm and adjustable about a horizontal axis at right angles to the arm, and a second bracket carrying the tool and mounted on the first mentioned bracket to swing about a vertical axis, a bearing member with roller bearings supporting the tool arm and engaging the same to support the arm in a horizontal plane and permit it to slide in the direction of its length, an upright shaft and combined rotary and thrust bearings supporting the bearing member and permitting the same to rotate about the shaft.

5. A support for a manually portable power driven rotary tool comprising a horizontal arm, a bearing box containing rollers supporting said arm from beneath, rollers guiding said arm from above and studs having eccentric bearing portions carrying said upper rollers whereby the rollers may be adjusted by rotating the studs, determining the clearance and contact of same with the arm, an upright shaft supporting the bearing box and combined rotary and thrust bearings with adjusting means therefor supporting the box on the shaft, the arm carrying at its outer end a bracket pivotally mounted on a horizontal bearing to swing in a vertical plane, means for securing the bracket in various positions of adjustment about said bearings, a second bracket, the first mentioned bracket having an upright shaft on which said tool bracket is mounted to rotate in a horizontal plane and to slide vertically, and a spring tending to raise said bracket.

6. A support for a manually portable power driven tool comprising an elongated horizontal arm, a bearing for the same supporting the arm to move in the direction of its length, a rotary support for said bearing having an upright axis, a shaft with means supporting the same on the end of the arm to swing in a vertical plane, a tool bracket mounted on the shaft to move in the direction of its length, a manually portable power driven tool mounted on the bracket, and a lever for moving the tool into and out of contact wtih the work, serving to hold it in operative relation to the work.

7. A support for a manually portable power driven tool comprising an elongated horizontal arm, a bearing for the same supporting the arm to move in the direction of its length, a rotary support for said bearing having an upright axis, a shaft with means supporting the same on the end of the arm to swing in a vertical plane, a tool bracket mounted on the shaft to move in the direction of the length of said shaft, a manually portable power driven tool mounted on the bracket and a lever for moving the tool into and out of contact with the work, serving to hold it in operative relation to the work, and a helical spring encircling the shaft and tending to support the tool out of contact with the work.

8. A support for a manually portable power driven tool comprising an elongated horizontal arm, a bearing for the same supporting the arm to move in the direction of its length, a rotary support for said bearing having an upright axis, a shaft with means supporting the same on the end of the arm to swing in a vertical plane, a tool bracket mounted on the shaft to move in the direction of its length, a manually portable power driven tool mounted on the bracket and a lever for moving the tool along the shaft into and out of contact with the work, serving to hold it in operative relation to the work, and a spring tending to support the tool out of contact with the work.

Signed by me at Towson, Maryland, this 23d day of April, 1927.

ALONZO G. DECKER.